US007004439B1

(12) United States Patent
Taylor et al.

(10) Patent No.: US 7,004,439 B1
(45) Date of Patent: Feb. 28, 2006

(54) MOUNTING BRACKET INCLUDING IMPACT RELEASE SAFETY MECHANISM

(75) Inventors: James F. Taylor, Saratoga, CA (US); Michael Daniel Schultz, Santa Cruz, CA (US); Paul LaDuca, Buffalo, NY (US)

(73) Assignee: Jet Lites LLC, Truckee, CA (US)

( * ) Notice: Subject to any disclaimer, the term of this patent is extended or adjusted under 35 U.S.C. 154(b) by 1 day.

(21) Appl. No.: 10/402,886

(22) Filed: Mar. 28, 2003

(51) Int. Cl.
*F16M 13/00* (2006.01)
*F21V 21/084* (2006.01)

(52) U.S. Cl. ....................... 248/548; 248/909; 362/106

(58) Field of Classification Search ................ 248/548, 248/900, 909, 291.1, 309.2, 505, 499; 362/105, 362/106
See application file for complete search history.

(56) References Cited

U.S. PATENT DOCUMENTS 1,349,312 A * 8/1920 Barrett ....................... 248/214
2,421,643 A * 6/1947 Ostli .......................... 362/106
2,721,719 A * 10/1955 Giese et al. ............. 248/219.4
2,765,398 A * 10/1956 Mays ......................... 362/105
3,069,538 A * 12/1962 Hobson ...................... 362/105
3,212,415 A * 10/1965 Byrd ........................... 404/10
4,195,328 A * 3/1980 Harris, Jr. ................... 362/549
4,260,534 A * 4/1981 Hanson et al. .............. 524/296
D274,758 S * 7/1984 Shing .......................... D26/39
4,521,831 A * 6/1985 Thayer ....................... 362/106
4,678,153 A * 7/1987 Maddock et al. ...... 248/229.13
4,923,164 A * 5/1990 Stenberg ..................... 248/530
4,926,592 A * 5/1990 Nehls ............................ 52/98
4,998,187 A * 3/1991 Herrick ...................... 362/103
5,061,056 A * 10/1991 You ........................... 359/872
5,197,819 A * 3/1993 Hughes ....................... 404/13
5,408,086 A * 4/1995 Morris et al. ......... 250/214 VT
5,412,545 A * 5/1995 Rising ........................ 362/105
5,507,545 A * 4/1996 Krysiak ..................... 296/97.9
5,542,627 A * 8/1996 Crenshaw et al. .......... 244/121
5,567,038 A * 10/1996 Lary .......................... 362/106
5,901,525 A * 5/1999 Doeringer et al. ......... 52/736.4
5,914,816 A * 6/1999 Soto et al. .................. 359/630
6,250,769 B1 * 6/2001 Kirk ........................... 362/106
6,309,085 B1 * 10/2001 Katz et al. .................. 362/234
6,422,783 B1 * 7/2002 Jordan ........................... 404/9
6,457,838 B1 * 10/2002 Dugmore et al. ........... 362/106

* cited by examiner

*Primary Examiner*—Anita M. King
(74) *Attorney, Agent, or Firm*—Mark J. Spolyar

(57) ABSTRACT

A mounting bracket including an impact release mechanism for use in connection with helmet-mount lights and other devices. In one embodiment, the mounting bracket is a two-piece assembly comprising a base plate, an upright bracket configured to detach from the base plate upon a sufficient impact or force. In one embodiment, the impact release mechanism is configured to allow the upright bracket to break away from the base plate without affecting the subsequent utility of the mounting bracket. After the upright bracket detaches from the base plate, the mounting bracket can be reassembled by pressing the base plate and upright bracket together to engage the features associated with the impact release mechanism. Other embodiments of the present invention feature a one-use mounting bracket wherein the upright bracket is integrally formed to the base plate at predefined failure points that allow the upright bracket to break away from the base plate upon sufficient impact.

18 Claims, 6 Drawing Sheets

MOUNTING BRACKET INCLUDING IMPACT RELEASE SAFETY MECHANISM

FIELD OF THE INVENTION

The present invention relates to mounting brackets and, more particularly, to a mounting bracket featuring a break-away impact release mechanism. Embodiments of the present invention are especially adapted for use in connection with helmet-mounted lights typically used by cyclists and other sports enthusiasts.

BACKGROUND OF THE INVENTION

Helmet-mounted lights are known. For example, JET Lites LLC of Santa Cruz, Calif., as well as other manufacturers, offers battery-powered lights that can be mounted to bicycle or other sports or safety helmets. Such helmet-mounted lights typically include a bracket to which a light is pivotally mounted. A base plate attached to the bracket allows the assembly to be secured to a helmet with the use of straps or other securing means. Helmet-mounted lights, especially for use in connection with mountain biking or other similar sports, presents certain safety issues that, prior to the invention described herein, have not been adequately addressed. Specifically, a light body mounted to a helmet presents a feature that, during a fall where the user's helmet contacts the ground for example, can catch the ground or otherwise be problematic during a fall. For example, the helmet-mounted light may catch the ground causing the user's helmet to shift and, therefore, not work optimally or properly and possibly place added stress on the user's head or neck during a fall. Accordingly, a need in the art exists for methods and apparatuses that provide an attachment for a helmet-mounted light that addresses the safety concerns discussed above. The present invention substantially fulfills this need.

SUMMARY OF THE INVENTION

The present invention provides a mounting bracket including an impact release mechanism for use in connection with helmet-mount lights and other devices. In one embodiment, the mounting bracket is a two-piece assembly comprising a base plate, an upright bracket configured to detach from the base plate upon a sufficient impact or force. In one embodiment, the impact release mechanism is configured to allow the upright bracket to break away from the base plate without affecting the subsequent utility of the mounting bracket. After the upright bracket detaches from the base plate, the mounting bracket can be reassembled by pressing the base plate and upright bracket together to engage the features associated with the impact release mechanism. Other embodiments of the present invention feature a one-use mounting bracket wherein the upright bracket is integrally formed to the base plate at predefined failure points that allow the upright bracket to break away from the base plate upon sufficient impact.

DESCRIPTION OF PREFERRED EMBODIMENT(S)

Figure 1A:
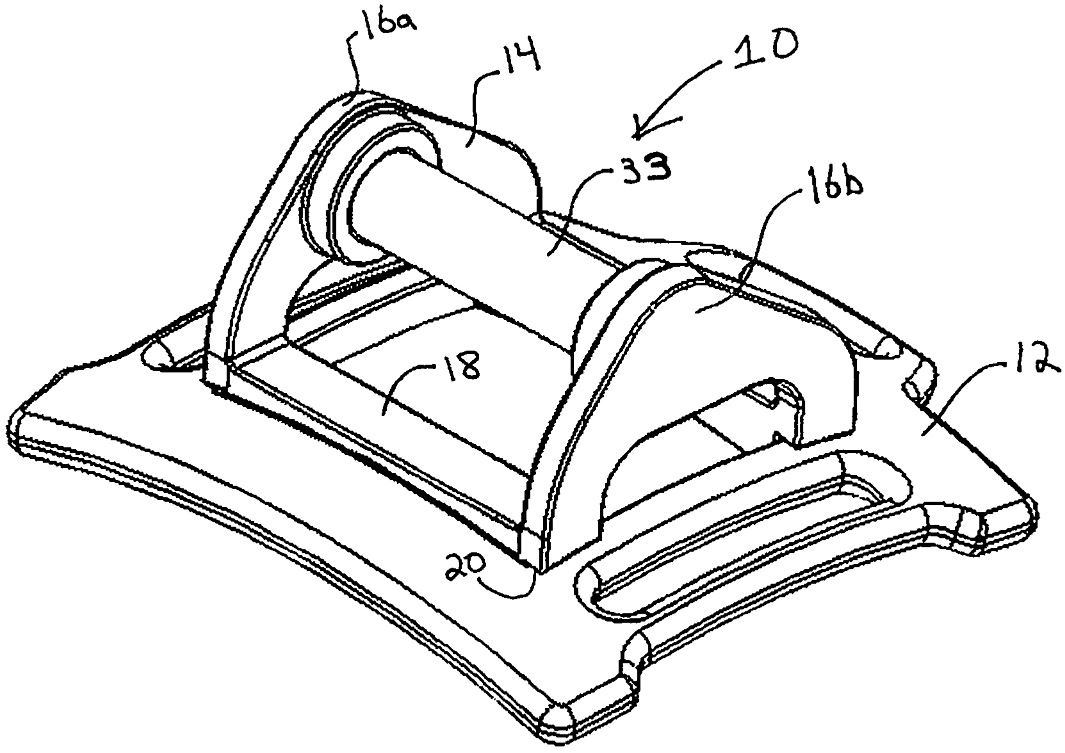
FIG. 1A is a perspective view of the mounting bracket according to an embodiment of the present invention.
Figure 1B:
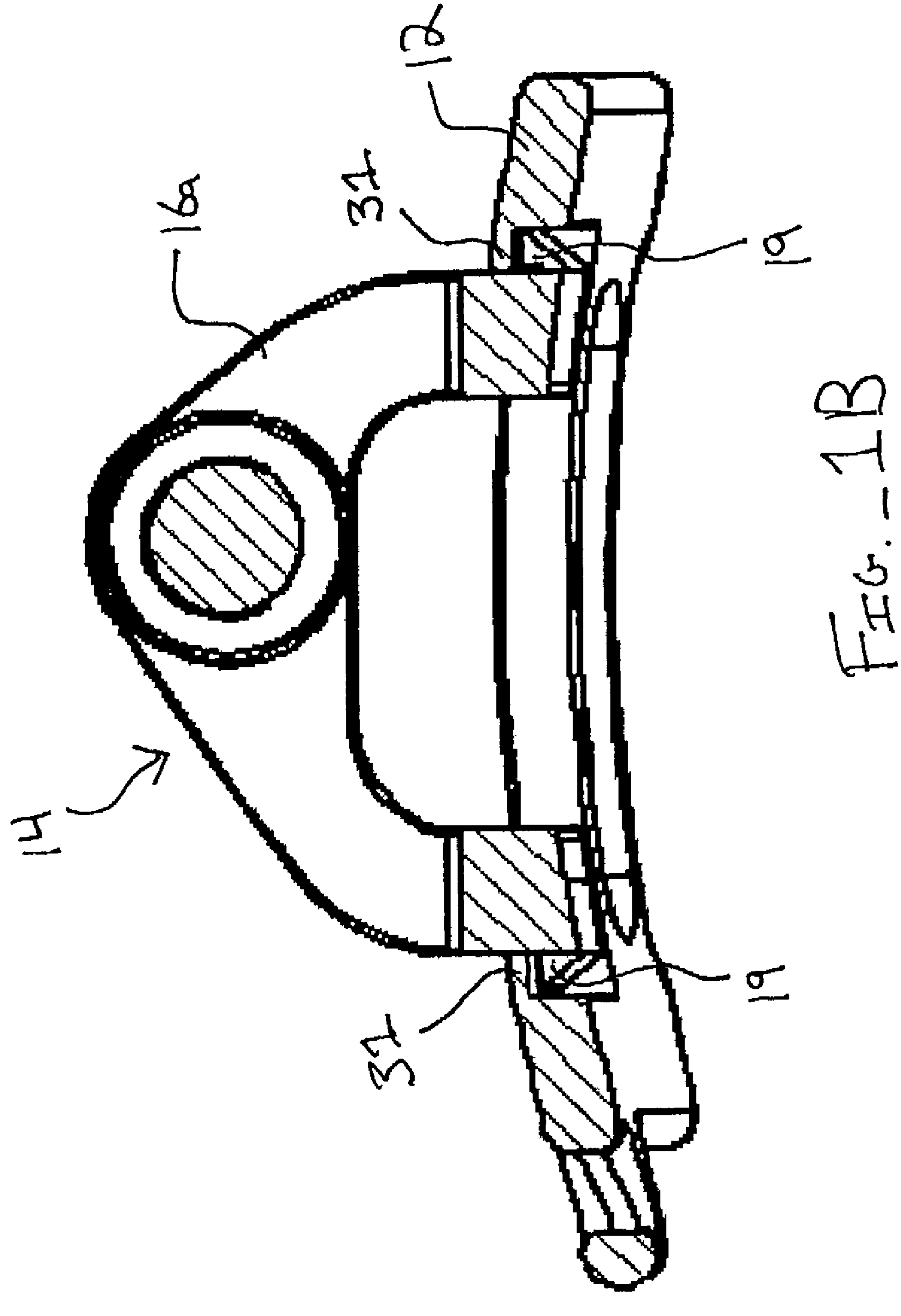
FIG. 1B is a sectional view of the mounting bracket according to an embodiment of the present invention.
Figure 2:
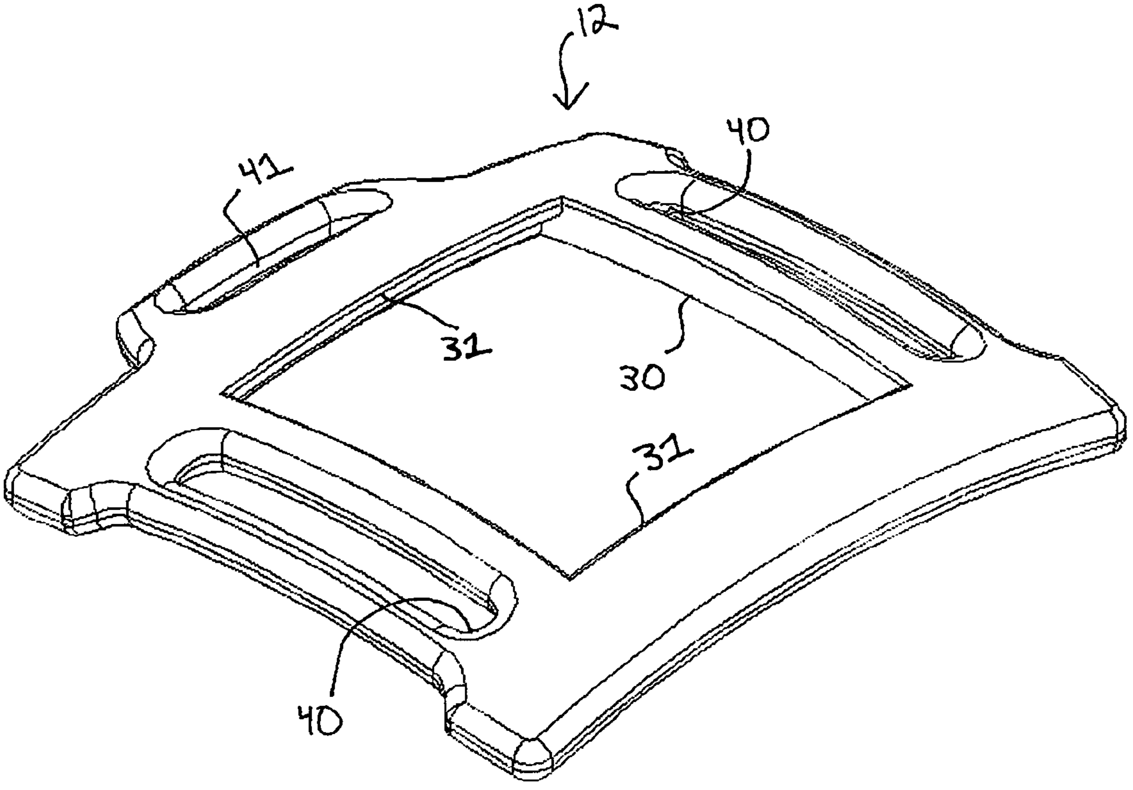
FIG. 2 is a perspective view of a base plate according to an embodiment of the present invention.

FIGS. 1A and 1B illustrate a mounting bracket 10 configured according to an embodiment of the present invention. As FIG. 1A provides, mounting bracket 10, in one embodiment, comprises base plate 12 and upright bracket 14. As FIG. 2 illustrates, base plate 12 includes rectangular cavity 30 and overhanging edges 31 extending along opposing sides of cavity 30. The bottom surface of base plate 12, in one embodiment, is contoured to substantially conform to the outer surface of a helmet. Base plate 12, in one embodiment, further includes lateral slots 40 and upper slot 41 allowing the base plate 12 to be attached to a helmet in a conventional manner using straps. Of course, as one skilled in the art will recognize any suitable means for attaching base plate 12 to a helmet can be used. In addition, mounting bracket 10 can be used without a helmet. For example, mounting bracket can be used with a head band extending between slots 40 and top strap spanning from the head band and upper slot 41.

Figure 3:
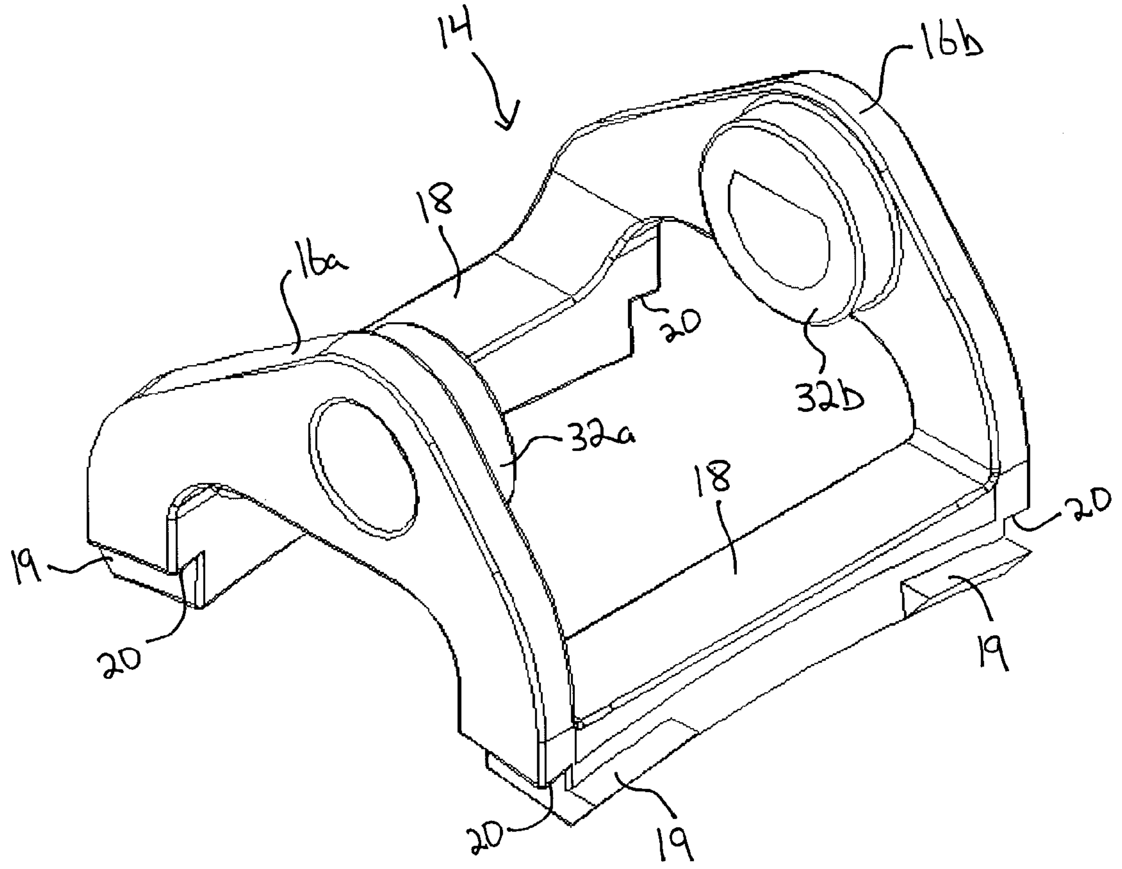
FIG. 3 is a perspective view of an upright bracket according to an embodiment of the present invention.

FIG. 3 illustrates an upright bracket 14 according to an embodiment of the present invention. Upright bracket 14, in one embodiment, comprises first and second unshaped arms 16*a*, 16*b* and first and second bar members 18 extending between respective ends of the first and second u-shaped arms 16*a*, 16*b*. Hubs 32*a*, 32*b* located at the respective apexes of first and second u-shaped arms 16*a*, 16*b* provide features to which axle 33 attaches (see FIG. 1A). As FIG. 3 illustrates, bar members 18 each include stepped regions 20 at opposing ends thereof and wedge-shaped tabs 19. As FIGS. 1A and 1B provide, upright bracket 14, in one embodiment, is configured such that bar members 18 fit within cavity 30 of base plate 12.

In one embodiment, upright bracket 14 and base plate 12 are both plastic parts fabricated by an injection molding process. For example, upright bracket 14 and base plate 12 can be made of glass-filled nylon, polycarbonate, polyethylene, or any other suitable material. In one embodiment, base plate 12 can be made of steel, aluminum or other metal.

In addition, as FIG. 1B illustrates, tabs 19 engage overhanging edges 31 of base plate 12 to secure upright bracket 14 to base plate 12. As FIGS. 1B and 3 illustrate, tabs 19 are wedge-shaped (in one embodiment, at a 45 degree angle). This configuration allows upright bracket 14 to be secured to base plate 12 by placing upright bracket 14 over cavity 30. The subsequent application of a compressive force in combination with the wedge-shape of tabs 19 causes u-shaped arms 16*a*, 16*b* to flex inwardly allowing tabs 19 to slide against overhanging edges 31. When fully engaged, bar members 18, in one embodiment, extend within cavity 30 and tabs 19 engage overhanging edges 31 to hold upright bracket 14 in place relative to mounting bracket 14. In one embodiment, when engaged as shown in FIGS. 1A and 1B, stepped regions 20 (contacting the upper surface of base plate 12) and tabs 19 (engaging overhanging edges 31) cooperate to secure upright bracket 14 to base plate 12.

Figure 4:
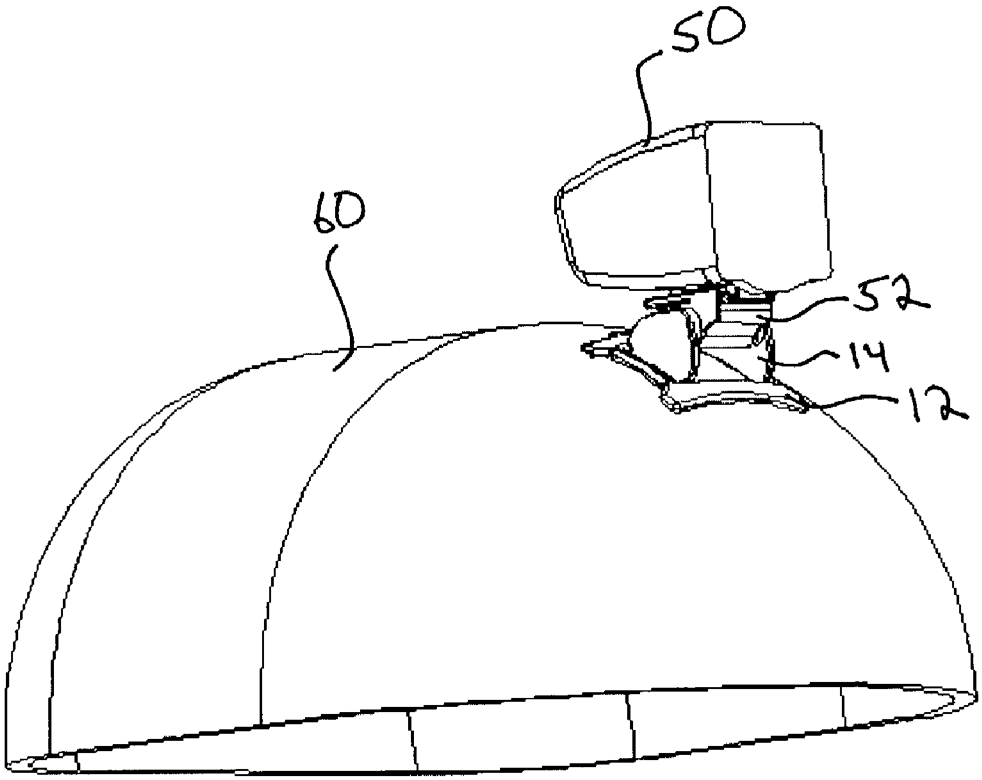
FIG. 4 is a perspective view illustrating application of the mounting bracket, according to an embodiment of the present invention, to provide an adjustable, helmet-mounted light.

FIG. 4 illustrates one application of the mounting bracket configured according to the present invention. As FIG. 4 illustrates, mounting bracket 10 can be used to provide a helmet-mounted light where mounting bracket 10 allows the light to essentially break away from the helmet during a head-impact crash. Specifically, as discussed above, base plate 12 attaches to helmet 60 using any suitable means, such as straps connected to lateral slots 40. A paddle 52 is pivotally mounted to axle 33 and connects light body 50 to bracket 14. The paddle 52 allows the user to adjust the angular position of light body 50 and the resulting beam relative to the helmet 60.

The dimensions of tabs 19 and overhanging edges 31 are configured such that upright bracket 14 releases from base plate 12 upon application of a sufficient force. Specifically, the plastic or other deformation of upper bracket 14, tabs 19 and/or overhanging edges 31 upon application of sufficient force (caused, for example, by a user impacting the ground during a crash) allows upright bracket 14, and any device (such as a light housing) attached thereto, to release from base plate 12.

As one skilled in the art will recognize, the present invention can be implemented in a wide array of different embodiments. For example, cavity 30 need not be rectangular or square. For example, cavity 30 could be other shapes depending on how the light body is mounted to the bracket; for example, if the light were mounted to the bracket with a ball joint, cavity 30 may be circular or polygonal.

Figure 5:
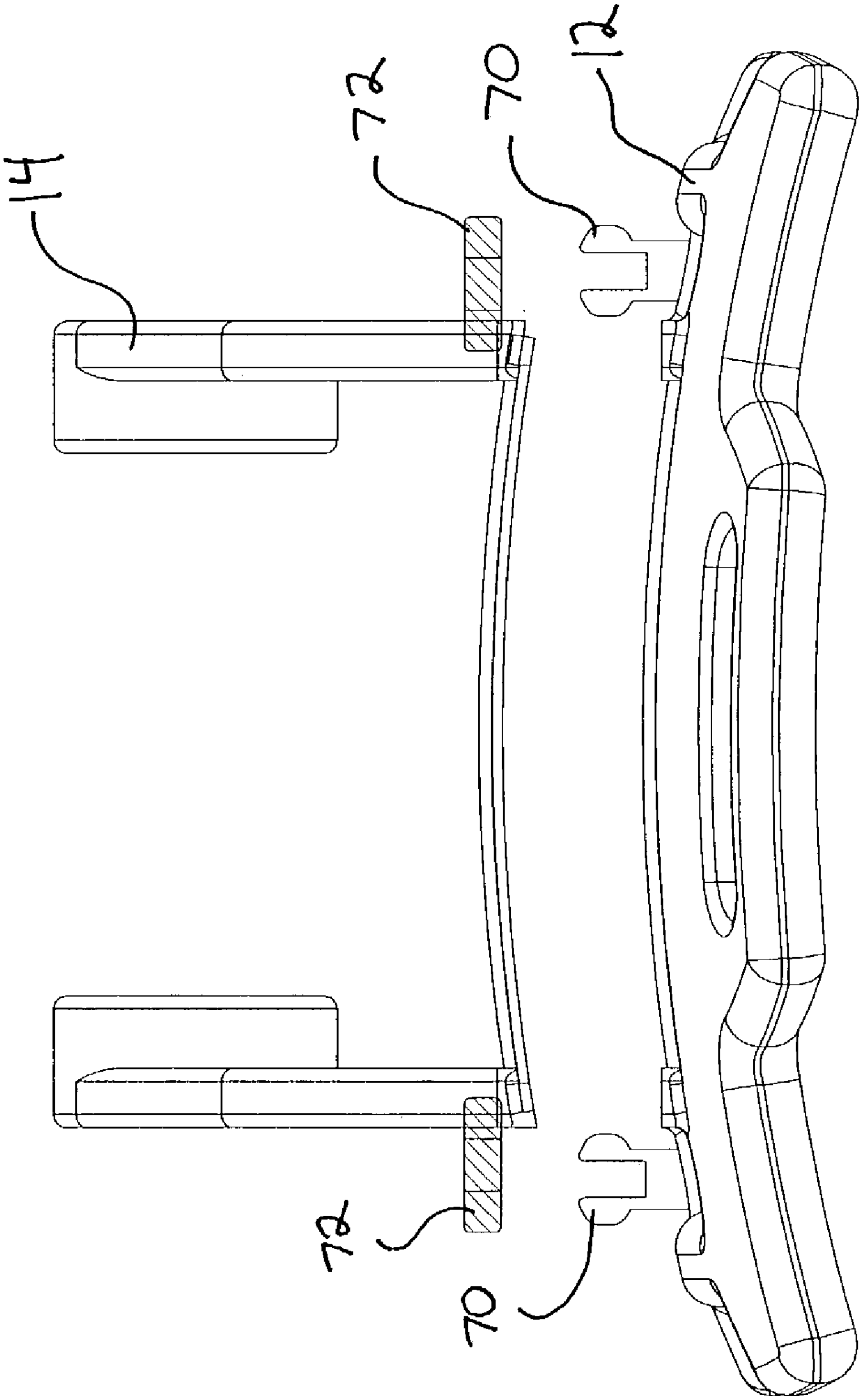
FIG. 5 is a plan view illustrating a mounting bracket including a release mechanism according to another embodiment of the present invention.

Still further, FIG. 5 illustrates a mounting bracket including an alternative releasable attachment mechanism. As FIG. 5 shows, base plate 12 includes push pins 70 extending upwardly therefrom. Upper bracket 14 includes mounting features 72 that engage push pins 70 to hold the upper bracket 14 against base plate 12. In one embodiment, the mounting features 72 comprise small extensions having a hole into which push pins 70 are inserted. In one embodiment, base plate 12 includes four push pins 70 arranged in a rectangular pattern, while upper bracket 14 includes four corresponding mounting features 72. Similar to the embodiment described above, upon application of sufficient force or impact, push pins 70 deform to release upper bracket 14 from base plate 12.

In addition, other embodiments of the present invention feature a one-piece design wherein the base plate and upright bracket are integrally formed as a unitary piece. According to this embodiment, the mounting bracket at the attachment between the ends of the u-shaped arms of the upright bracket and the base plate include stress or failure points that are configured to fail upon application of a sufficient force.

Lastly, although the present invention has been described with reference to specific embodiments, various other embodiments are possible without departing from the scope of the present invention. Other embodiments of the present invention will be apparent to one of ordinary skill in the art. It is, therefore, intended that the claims set forth below not be limited to the embodiments described above.

What is claimed is:

1. A mounting bracket, comprising a base plate configured for attachment to a helmet, and an upright bracket attached to the base plate and configured to release from the base plate upon application of sufficient force; and wherein the upright bracket comprises first and second u-shaped arms, wherein the first and second u-shaped arms each include an apex, and an axle extending between the respective apexes of the first and second u-shaped arms; and wherein the ends of the first and second u-shaped arms abut against the base plate.

2. The mounting bracket of claim 1 wherein the base plate includes first and second slots along opposing lateral sides thereof.

3. The mounting bracket of claim 1 further comprising a paddle attached to and rotatable about the axle, and a light body attached to the paddle.

4. The mounting bracket of claim 1 wherein the base plate and the upright bracket attach at at least one stress point adapted to break away, thereby releasing the upright bracket from the base plate, upon application of sufficient force.

5. The mounting bracket of claim 1 wherein the base plate comprises at least one push pin extending therefrom; wherein the upright bracket includes at least one hole aligned with the at least one push pin; and wherein the at least one push pin and the at least one hole are configured to release the upright bracket from the base plate upon application of sufficient force.

6. A mounting bracket, comprising a base plate configured to be attached to a helmet, said base plate including a cavity having an overhanging edge extending along at least a portion of the periphery of the cavity;

an upright bracket comprising first and second arms and first and second bar members extending between respective ends of the first and second arms, wherein the bar members are configured to fit within the cavity of the base plate and releasably engage the overhanging edge.

7. The mounting bracket of claim 6 wherein the first and second bar members each comprise at least one wedge-shaped member extending outwardly therefrom to engage the overhanging edge of the cavity.

8. The mounting bracket of claim 6 wherein the first and second arms are u-shaped.

9. The mounting bracket of claim 8 wherein the first and second u-shaped arms each include an apex, and wherein the mounting bracket further comprises an axle extending between the respective apexes of the first and second u-shaped arms.

10. The mounting bracket of claim 9 further comprising a paddle attached to and rotatable about the axle, and a light body attached to the paddle.

11. The mounting bracket of claim 9 further comprising a paddle attached to the axle and allows for rotation of a light body about the axle along axis thereof.

12. The mounting bracket of claim 6 wherein the base plate includes first and second slots along opposing lateral sides thereof.

13. A mounting bracket, comprising a base plate configured for attachment to a helmet, and an upright bracket attached to the base plate and configured to release from the base plate upon application of sufficient force; wherein the upright bracket comprises first and second lateral arms, wherein the first and second lateral arms each include an apex, and wherein the ends of the first and second lateral arms abut against the base plate; and an axle extending between the respective apexes of the first and second lateral arms.

14. The mounting bracket of claim 13 further comprising a paddle attached to and rotatable about the axle, and a light body attached to the paddle.

15. A mounting bracket, comprising a base plate configured for attachment to a helmet, said base plate including a cavity having an overhanging edge extending along at least a portion of the periphery of the cavity; and an upright bracket having a lower portion configured to fit within the cavity of the base plate and releasably engage the overhanging edge, wherein the lower portion of the upright bracket comprises first and second bar members each including at least one wedge-shaped member extending outwardly therefrom to engage the overhanging edge of the cavity;

an axle attached and extending between upper portions of the upright bracket; and a light body pivotally attached to the axle.

16. A mounting bracket, comprising a base plate configured for attachment to a helmet, said base plate including a cavity having an overhanging edge extending along at least a portion of the periphery of the cavity; and an upright bracket having a lower portion configured to fit within and engage the overhanging edge of the cavity of the base plate and releasably disengage the overhanging edge upon application of sufficient force, and wherein the upright bracket comprises first and second u-shaped arms.

17. The mounting bracket of claim 16 wherein the first and second u-shaped arms each include an apex, and wherein the mounting bracket further comprises an axle extending between the respective apexes of the first and second u-shaped arms.

18. The mounting bracket of claim 17 further comprising a paddle attached to and rotatable about the axle, and a light body attached to the paddle.

* * * * *